(12) United States Patent
Kiszewski (10) Patent No.: US 10,400,670 B2
(45) Date of Patent: Sep. 3, 2019

(54) INLET PARTICLE SEPARATOR FOR A TURBINE ENGINE

(71) Applicant: General Electric Company, Schenectady, NY (US)

(72) Inventor: Courtney Ann Kiszewski, Ipswich, MA (US)

(73) Assignee: General Electric Company, Schenectady, NY (US)

( * ) Notice: Subject to any disclaimer, the term of this patent is extended or adjusted under 35 U.S.C. 154(b) by 447 days.

(21) Appl. No.: 15/182,730

(22) Filed: Jun. 15, 2016

(65) Prior Publication Data

US 2017/0363000 A1    Dec. 21, 2017

(51) Int. Cl.
| | |
|---|---|
| *F02C 7/052* | (2006.01) |
| *F01D 9/04* | (2006.01) |
| *F02C 3/04* | (2006.01) |
| *B64D 33/02* | (2006.01) |

(52) U.S. Cl.
CPC .............. *F02C 7/052* (2013.01); *F01D 9/041* (2013.01); *F02C 3/04* (2013.01); *B64D 2033/0246* (2013.01); *F05D 2220/32* (2013.01); *F05D 2240/12* (2013.01); *F05D 2260/607* (2013.01); *Y02T 50/675* (2013.01)

(58) Field of Classification Search
CPC ... B64D 2033/0246; F01D 9/041; F02C 3/04; F02C 7/052; F05D 2220/32; F05D 2240/12; F05D 2260/607; Y02T 50/675
See application file for complete search history.

(56) References Cited

U.S. PATENT DOCUMENTS

| | | | |
|---|---|---|---|
| 3,066,912 A | 12/1962 | Scheper, Jr. | |
| 3,073,377 A | 1/1963 | Robinson | |
| 3,309,867 A * | 3/1967 | Ehrich | F02C 7/05 |
| | | | 415/121.2 |
| 3,521,431 A * | 7/1970 | Buckley | F02C 7/052 |
| | | | 55/306 |
| 3,534,548 A | 10/1970 | Connors | |
| 3,673,771 A * | 7/1972 | Dickey | B01D 45/08 |
| | | | 415/121.2 |
| 3,733,814 A | 5/1973 | Hull et al. | |
| 3,832,086 A * | 8/1974 | Hull, Jr. | B04C 3/06 |
| | | | 137/15.1 |
| 3,892,612 A | 7/1975 | Carlson et al. | |

(Continued)

FOREIGN PATENT DOCUMENTS

WO    2014/092778 A1    6/2014

OTHER PUBLICATIONS

International Search Report and Written Opinion issued in connection with corresponding PCT Application No. PCT/US17/026743 dated Jul. 4, 2017

(Continued)

*Primary Examiner* — Jesse S Bogue
(74) *Attorney, Agent, or Firm* — Dority & Manning, P.A.

(57) ABSTRACT

A method and apparatus for separating particles from an inlet airflow of a turbine engine has a centerbody with at least one radially outward scavenge conduit. The inlet airflow has entrained particulate matter, which can impact an impact surface defining part of the centerbody. The particulate matter is radially diverted outward through at least one inlet to a scavenge conduit, unable to make a turn defined by the shape of the centerbody.

23 Claims, 4 Drawing Sheets

(56) References Cited

U.S. PATENT DOCUMENTS

| | | | |
|---|---|---|---|
| 3,952,972 A | 4/1976 | Tedstone et al. | |
| 3,970,439 A | 7/1976 | Murphy | |
| 3,979,903 A * | 9/1976 | Hull, Jr. | F02C 7/05 60/39.092 |
| 3,993,463 A * | 11/1976 | Barr | B01D 45/16 55/306 |
| 4,158,449 A | 6/1979 | Sun et al. | |
| 4,268,287 A * | 5/1981 | Norris | B01D 45/08 55/306 |
| 4,289,611 A | 9/1981 | Brockmann | |
| 4,309,147 A | 1/1982 | Koster et al. | |
| 4,509,962 A * | 4/1985 | Breitman | B01D 45/16 137/15.1 |
| 4,592,765 A * | 6/1986 | Breitman | F02C 7/05 415/121.2 |
| 4,617,028 A | 10/1986 | Ray et al. | |
| 4,622,050 A | 11/1986 | O'Connor | |
| 4,702,071 A * | 10/1987 | Jenkins | F02C 7/052 415/121.2 |
| 4,704,145 A * | 11/1987 | Norris | F02C 7/052 55/306 |
| 4,798,047 A | 1/1989 | Geary | |
| 4,860,534 A * | 8/1989 | Easley | F02C 7/047 60/39.092 |
| 4,901,520 A | 2/1990 | Kozak et al. | |
| 4,928,480 A * | 5/1990 | Oliver | B64D 33/02 55/306 |
| 5,039,317 A | 8/1991 | Thompson et al. | |
| 5,165,236 A | 11/1992 | Nieminen | |
| 5,294,410 A | 3/1994 | White | |
| 5,464,479 A | 11/1995 | Kenton et al. | |
| 5,918,458 A | 7/1999 | Coffinberry et al. | |
| 6,508,052 B1 * | 1/2003 | Snyder | B01D 45/08 137/15.1 |
| 6,698,180 B2 * | 3/2004 | Snyder | B01D 45/08 137/15.1 |
| 6,702,873 B2 | 3/2004 | Hartman | |
| 7,284,953 B2 | 10/2007 | Silverman et al. | |
| 7,374,593 B2 * | 5/2008 | Snyder | B01D 45/06 55/306 |
| 7,581,397 B2 * | 9/2009 | Strangman | F04D 29/441 415/121.2 |
| 7,608,122 B2 * | 10/2009 | Snyder | F02C 7/052 55/306 |
| 7,695,243 B2 | 4/2010 | Lee et al. | |
| 7,777,155 B2 | 8/2010 | Twelves, Jr. et al. | |
| 7,854,778 B2 * | 12/2010 | Groom | B64D 33/02 55/306 |
| 7,931,740 B2 | 4/2011 | Al-Alusi et al. | |
| 8,092,145 B2 | 1/2012 | Martel et al. | |
| 8,256,277 B2 * | 9/2012 | Khibnik | F01D 17/24 73/112.01 |
| 8,469,309 B2 | 6/2013 | Stuart et al. | |
| 8,506,836 B2 | 8/2013 | Szuromi et al. | |
| 8,561,411 B2 | 10/2013 | Dibenedetto | |
| 8,663,350 B2 * | 3/2014 | Snyder | B01D 45/02 55/306 |
| 8,668,442 B2 | 3/2014 | Morris et al. | |
| 8,945,254 B2 * | 2/2015 | Mayer | F02C 7/052 55/306 |
| 9,046,056 B2 | 6/2015 | Lerg | |
| 9,394,827 B2 * | 7/2016 | Judd | F02C 7/05 |
| 9,631,554 B2 * | 4/2017 | Howe | F02C 7/052 |
| 2003/0024233 A1 * | 2/2003 | Snyder | B01D 45/08 60/39.092 |
| 2010/0236200 A1 * | 9/2010 | Saeed | B01D 45/04 55/306 |
| 2013/0323473 A1 | 12/2013 | Dietsch et al. | |
| 2014/0119891 A1 | 5/2014 | Schmittenberg et al. | |
| 2014/0182292 A1 | 7/2014 | Hudon et al. | |
| 2014/0237954 A1 * | 8/2014 | Snyder | F02C 7/052 55/306 |
| 2014/0241850 A1 | 8/2014 | Duge | |
| 2014/0286790 A1 | 9/2014 | Molter et al. | |
| 2014/0290254 A1 | 10/2014 | Manning et al. | |
| 2015/0040535 A1 | 2/2015 | Judd et al. | |
| 2015/0052872 A1 | 2/2015 | Zurmehly et al. | |
| 2015/0292408 A1 * | 10/2015 | Suciu | F02C 7/052 415/121.2 |
| 2017/0211475 A1 | 7/2017 | Mayer et al. | |

OTHER PUBLICATIONS

Manteiga, J.A. et al., Fine debris multi-stage separation system, GE co-pending U.S. Appl. No. 15/215,345, filed Jul. 20, 2016.

Jeffrey Carl Mayer et al., filed Jan. 21, 2016, U.S. Appl. No. 15/002,839.

John Alan Manteiga et al., filed Jul. 20, 2016, U.S. Appl. No. 15/215,345.

* cited by examiner

INLET PARTICLE SEPARATOR FOR A TURBINE ENGINE

BACKGROUND OF THE INVENTION

Engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation. Additionally, fluidic systems where the flow of dirty fluid, such as containing particulate matter, can include a downstream engine, such as in a tank or power plant.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components that require cooling. While the turbine air is a high temperature, it is cooler relative to the compressor air, and can be used to cool the turbine. When cooling the turbines, cooling air can be supplied to various turbine components, including the interior of the turbine blades and the turbine shroud.

Particles, such as dirt, dust, sand, volcanic ash, and other environmental contaminants in the engine intake air can cause severe compressor erosion. As the particles move through the engine they can melt in the combustion gases and subsequently resolidify on the turbine flow path surfaces. Particles entrained in the turbine cooling air can cause a loss of cooling due to deposition and plugging of the cooling passages. All of these effects cause reduced operational time or "time-on-wing" for the aircraft environment. This problem is exacerbated in certain operating environments around the globe where turbine engines are exposed to significant amounts of airborne particles.

BRIEF DESCRIPTION OF THE INVENTION

In one aspect, a turbine engine comprising an engine inlet having a centerbody and defining an inlet duct defining an inlet airflow path, an engine core arranged downstream of the centerbody and defining an engine centerline, and an inlet particle separator having at least first and second scavenge plenums with corresponding first and second plenum inlets to define corresponding first and second scavenge flow paths from the airflow path to the first and second scavenge plenums, with the first and second scavenge plenums are fluidly separated and arranged radially outwardly about at least a portion of the centerbody.

In another aspect, a method of separating particles from an inlet airflow of a turbine engine having a centerbody and defining an engine centerline, the method comprising drawing a first scavenge airflow from the inlet airflow, drawing a second scavenge airflow from the inlet airflow at a different location than the first scavenge airflow, wherein the first and second scavenge airflows are fluidly isolated from each other.

DESCRIPTION OF EMBODIMENTS OF THE INVENTION

The described embodiments of the present invention are directed to systems, methods, and other devices related to particle removal, particularly in a turbo shaft turbine engine, and more particularly to the removal of particles from the engine intake airflow to a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

As used herein, the terms "axial" or "axially" refer to a dimension along a longitudinal axis of an engine or along a longitudinal axis of a component disposed within the engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine, an outer engine circumference, or a circular or annular component disposed within the engine. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

As used herein, the terms "tangential" or "tangentially" refer to a dimension extending perpendicular to a radial line with respect to the longitudinal axis of the engine or the longitudinal axis of a component disposed therein.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Figure 1:
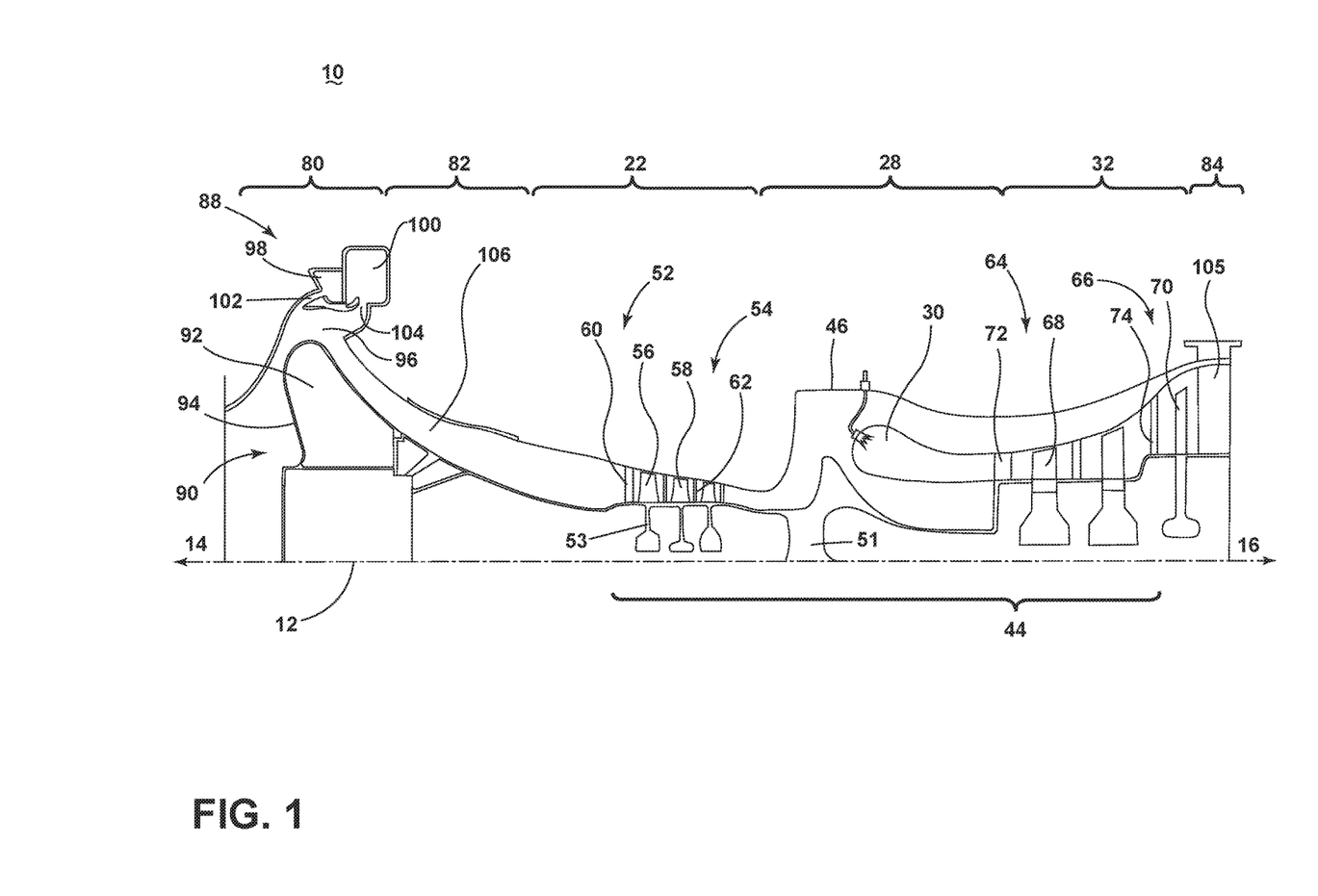
FIG. 1 is a cross-sectional view of the gas turbine engine of FIG. 1 having an inlet particle separator.
Figure 2:
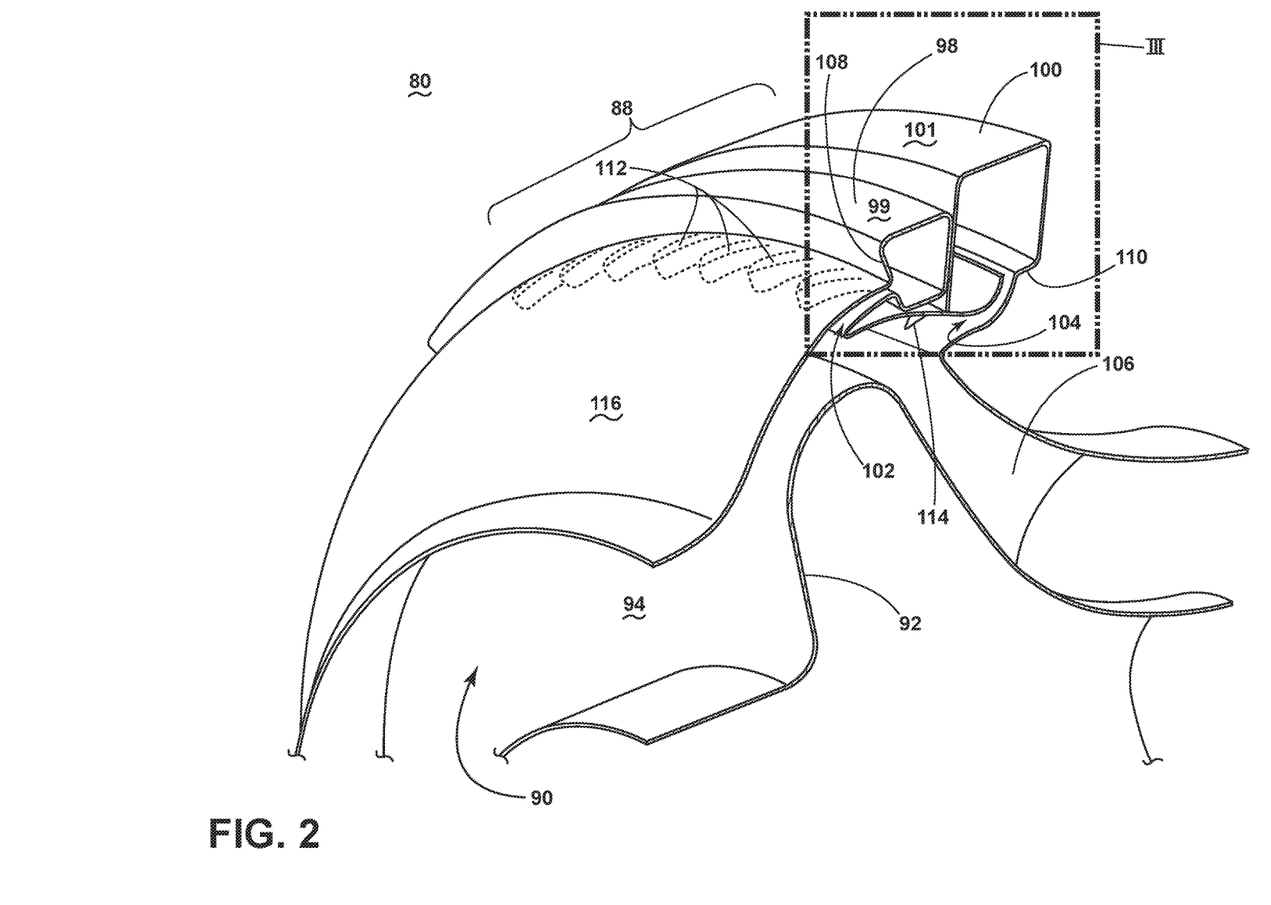
FIG. 2 is a perspective view of the inlet particle separator of FIG. 1.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a compressor section 22, a combustion section 28 including a combustor 30, and a turbine section 32. The compressor section 22, the combustor 30, and the turbine section 32 form a core 44 of the engine 10, which generates combustion gases. The core casing 46 surrounds the core 44. All rotating portions of the engine 10 are referred to individually or collectively as a rotor 51.

The compressor section 22 includes a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can mount to a disk 53 as part of the rotor 51, with each stage having its own disk. The vanes 60, 62 mount to the core casing 46 in a circumferential arrangement about the rotor 51.

The turbine section 32 includes a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, air is supplied to the compressor 22 where ambient air is pressurized. The pressurized air is mixed with fuel in the combustor 30 and ignited, thereby generating combustion gases. Some work is extracted from these gases by the turbine section 32, which drives the compression section 22.

Some of the ambient air can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, as it is directly downstream of the combustion section 28. Other sources of cooling fluid can be, but is not limited to, fluid discharged from the compressor section 22.

A conduit section 82 includes a flow conduit 106 fluidly coupling the compressor section 22 to an inlet section 80, wherein the inlet section 80 is axially forward of the compressor section 22. An inlet 90 provides access to an inlet duct 96 fluidly coupled to the flow conduit 106. The flow of air provided to the inlet 90 can pass around a centerbody 92 through the inlet duct 96 and into the flow conduit 106, providing air to the compressor section 22. An outlet section 84 is axially downstream of the engine core 44 and has one or more struts 105 arranged radially around the engine centerline 12.

The inlet section 80 further includes an inlet particle separator 88 with the inlet 90 and the centerbody 92. The inlet 90 defines an opening for providing a flow of air to the downstream sections. Axially downstream of the inlet 90 is the centerbody 92 having an impact surface 94 formed by a portion of the centerbody 92, confronting a flow of air provided from the inlet 90. The inlet duct 96 is defined about the centerbody 92 and radially, outwardly bounded by the inlet particle separator 88 in fluid communication with the inlet duct 96.

The inlet particle separator 88 comprises at least first and second scavenge plenums 98, 100. Scavenge plenum inlets 102, 104 provide fluid communication between the inlet duct 96 and the scavenge plenums 98, 100. The inlet 90, centerbody 92, and the scavenge conduit 96 are all annular, such that the inlet duct 96 is radially defined around the engine centerline 12. It is contemplated that the scavenge plenums 98, 100 can alternatively comprise other scrolls, scavenge conduits, or can be a combination of multiple scavenge conduits arranged radially about the engine centerline 12.

Figure 3:
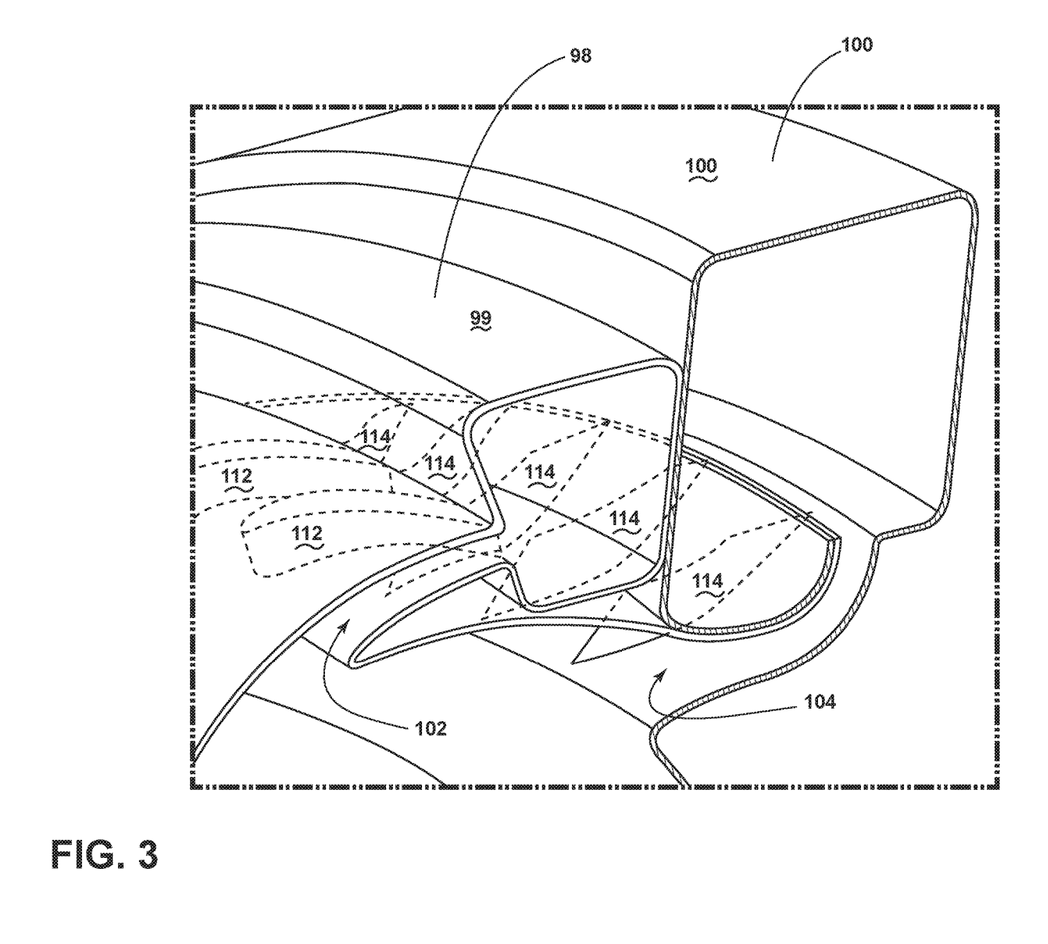
FIG. 3 is a perspective view of a call out portion III of the inlet particle separator of FIG. 2.

Turning to FIG. 3, a perspective view of a cross section of the inlet section 80 illustrates the arrangement of the first and second scavenge plenums 98, 100. The first scavenge plenum 98 can be formed with or attached to an outer surface 116 of the inlet section 80 and positioned axially forward and radially inward of at least a portion of the second scavenge plenum 100. The first and second scavenge plenums 98, 100 can be different sizes and both can be formed into conduits 99, 101 parallel to and fluidly separate from each other. Each scavenge plenum 98, 100 can partially or completely circumscribe the centerbody 92. Each scavenge plenum 98, 100 can have exit locations (not shown) that are a function of engine geometry. The scavenge flows may mix prior to a common exit or have separate exits. The plenum exits may be positioned anywhere along the circumference of the plenum to meet design needs.

The first plenum inlet 102 is fluidly connected to the first scavenge plenum 98 on an axial face 108 of the conduit 99. A plurality of guide vanes 112 illustrated in dashed lines are circumferentially spaced within the first plenum inlet 102.

The second plenum inlet 104 is axially aft and radially inward of the first plenum inlet 102 and is fluidly connected to the second scavenge plenum 100 on a radial base 110 of the conduit 101. A plurality of guide vanes 114 are circumferentially spaced within the second plenum inlets 104.

The structural elements of the inlet particle separator 88 can be interconnectable to form the inlet particle separator 88. The inlet particle separator 88 can be mechanically removable from the conduit section 82. Installation and maintenance of the inlet section 80 is facilitated with this removability. It should be understood, however, that differing manufacturing combinations are possible to develop the apparatus disclosed herein.

Figure 4:
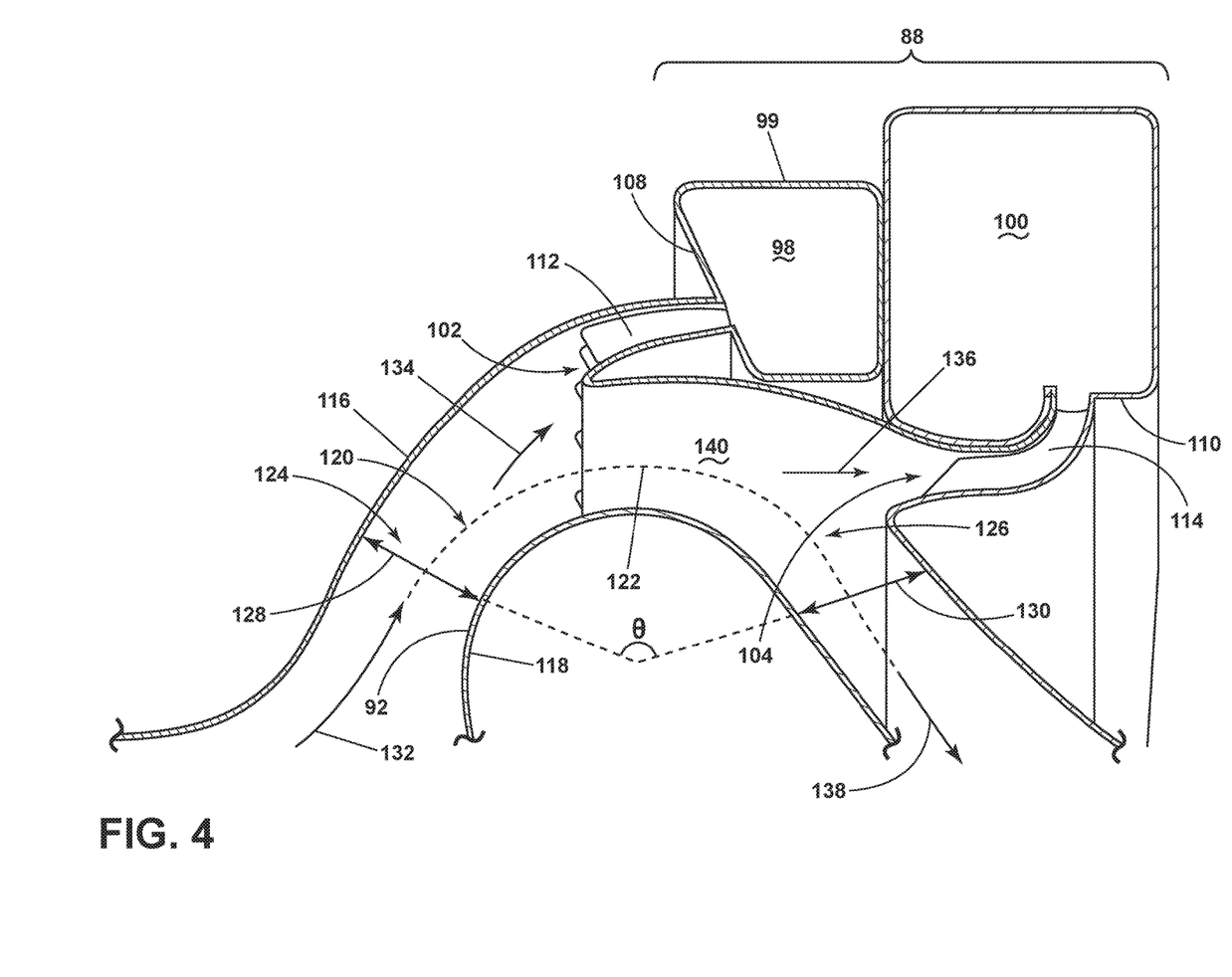
FIG. 4 is a sectional view of the inlet particle separator.

FIG. 4 is the enlarged portion of FIG. 3 of the inlet particle separator 88. Visible in dashed lines are the plurality of circumferential guide vanes 112 in the first plenum inlet 102 and the circumferential guide vanes 114 in the second plenum inlet 104. The first plenum inlet guide vanes 112 turn from a substantially axial direction to a circumferential direction. The second plenum inlet guide vanes 114 turn from an axial direction to a radial direction. Each circumferential guide vane 112, 114 is oriented and spaced to control any bouncing of particles upon entering the plenum inlets 102, 104 and to turn airflow entering the scavenge plenums 98, 100 thereby reducing space used for implementing multiple scavenge plenums 98, 100.

FIG. 4 illustrates a cross-section of the inlet duct 96 of the inlet particle separator 88, having radially outer 116 and inner 118 surfaces defining the inlet 90, the inlet duct 96, and the flow conduit 106 to define an inlet airflow path 120. The inlet duct 96 further defines a turn 122 about the centerbody 92 with the impact surface 94 upstream of the inlet duct 96.

The plenum inlets 102, 104 fluidly couple to the inlet duct 96 at a first and second 124, 126 portion of the turn 122. An inlet 128 axially forward of the first portion 124 of the turn 122 can have a cross-sectional area such that the air entering the inlet duct 96 will accelerate. Additionally, an outlet 130 axially aft of the second portion 126 of the turn 122 can have a cross-sectional area downstream of the plenum inlets 100, such that an airflow entering the flow conduit 106 can decelerate before moving to the compressor section 22. In some variations, the cross-sectional area downstream of the plenum inlets 100 can cause an acceleration. The turn 122 can be defined between the inlet 128 and the outlet 130 and can comprise a turn angle θ of at least 100 degrees.

An inlet airflow 132 is provided through the inlet 90 having a substantially axial flow direction. The inlet airflow 132 turns to move into the inlet duct 96 along the inlet airflow path 120 in a substantially radially outward direction and accelerates into the turn 122 through the inlet 128. Particle matter entrained within the airflow 132 and having a relatively larger mass can impact the impact surface 94 due to inertia and slow down before moving into the inlet duct 96.

The airflow 132 turns into the inlet duct 96 along the airflow path 120. Particles in the airflow 132 that enter the inlet duct 96 with relatively larger masses enter the first plenum inlet 102 as a first scavenge airflow 134 due to inertia, wherein the first scavenge airflow 134 is drawn from a radially outer extent of the inlet airflow 132. The guide vanes 112 axially turn the first scavenge flow 134 into the first scavenge plenum 98.

Any remaining particles entrained in the airflow 132 move in a substantially straight line due to inertia toward the second plenum inlet 104 becoming a second scavenge flow 136. The guide vanes 114 radially turn the second scavenge flow 136 into the second scavenge plenum 100. The second scavenge flow 136 is axially aft and radially inward of the first scavenge flow 134.

A remaining cleaner airflow 138 is then provided to the compressor section 22 through the flow conduit 106. The cleaner airflow 138 has at least a 70% reduction of fine particles and at least 95% of larger particles when compared to the original airflow 132. While the first plenum inlet 102 captures a majority of the larger particles in the airflow 132, providing a second and separate scavenge plenum 100 allows for a capture of many of the fine particles and any remaining larger particles.

An additional outer surface 140 is provided between the first and second plenum inlets 102, 104 that parallels the turn 122 and terminates in the second plenum inlet 104. This paralleling arrangement is formed to eliminate or reduce pockets around the airflow path 120. Providing a first and second scavenge plenum 98, 100 with this geometry contributes to more flexibility for shaping the flow path 120 to reduce or eliminate separated flow and recirculation zones that can negatively impact fine sand separation efficiency.

A method of separating particles from an inlet airflow of a turbine engine 10 having a centerbody 92 and defining an engine centerline 12 includes drawing a first scavenge airflow 134 from the inlet airflow 132 and then drawing a second scavenge airflow 136 from the inlet airflow 132 where the second scavenge airflow 136 is fluidly isolated from the first scavenge airflow 132. The second scavenge airflow 134 is drawn downstream of the first scavenge airflow 132 with little or no recirculation of the inlet airflow 132 occurring between the first and second plenum inlets 102, 104.

It should be appreciated that the inlet particle separator 88 disclosed herein uses a dual stage scavenge system to remove particles from the inlet airflow 132 resulting in a cleaner airflow 138 entering the core through sizing, orientation, and placement of scavenge plenums 98, 100. While illustrated as two scavenge plenums, this approach can be applied to scavenge systems with a plurality of scavenge plenums. The positioning and orientation of the plenum inlets 102, 104 on outer sections of the inlet airflow path 120 target large (momentum/rebound dominant) particles and small (drag dominant) particles by skimming them off of outer portions of the airflow 132.

It should also be further understood that the scavenge plenums 98, 100 are fluidly separate for the capturing of particles, but can be fluidly connected at a further stage for depositing of the particles or other purposes.

It should be appreciated that utilizing a substantial turn 122 in combination with an impact surface 94 and radially disposed scavenge conduit 96 can remove a greater portion of particulate matter entering the engine 10, as compared to other inlet particle separators having a smaller turn.

It should be further appreciated that the guide vanes 112, 114 are shaped and orientated to maximize sand separation and minimize aerodynamic losses in the system and can vary based on engine cycle conditions.

Benefits associated with the inlet particle separator described herein include improved particle separation, particularly with respect to fine particles, reducing ingested sand within the engine and improving engine time on wing. Other benefits include having decoupling plenums that can allow for compact packaging of individual plenums without the need to link stages together with a large common plenum. Independent plenums allow for a plurality of flow split configurations between scavenge plenums, wherein each configuration can be optimized for the engine cycle conditions.

It should also be understood that in an environment where an inlet particle separator is not required, the inlet particle separator can be designed to be removable to improve specific fuel consumption.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   an engine inlet having a centerbody and defining an inlet duct defining an inlet airflow path, wherein the engine inlet comprises an impact surface, wherein the impact surface is upstream of the inlet duct, wherein the inlet duct comprises an inner surface defining a turn about the centerbody defined between an inlet and an outlet and having a turn angle of 100° or more;
   an engine core arranged downstream of the centerbody and defining an engine centerline; and
   an inlet particle separator having at least first and second scavenge plenums with corresponding first and second plenum inlets to define corresponding first and second scavenge flow paths from the airflow path to the first and second scavenge plenums, wherein:
the first and second plenum inlets are axially spaced with respect to the engine centerline with the second plenum inlet being located downstream of the first plenum inlet,
the first and second scavenge plenums are fluidly separated and arranged radially outwardly about at least a portion of the centerbody,
the impact surface is positioned radially inwardly from the first plenum inlet
the inner surface defining the turn is positioned radially inward of the first and second plenum inlets,
the first plenum inlet fluidly couples the first scavenge plenum to a first portion of the turn about the centerbody,
the second plenum inlet fluidly couples the second scavenge plenum to a second portion of the turn about the centerbody, and
the second portion of the turn is axially forward of the outlet with respect to the engine centerline.

2. The turbine engine of claim 1 wherein the first and second scavenge plenums are radially offset.

3. The turbine engine of claim 1, wherein the first and second scavenge plenums are formed or attached to a radially outer surface of the inlet section, wherein the first and second plenum inlets are joined by an additional outer surface therebetween, and wherein the second plenum inlet is located downstream of the first plenum inlet in a downstream serial flow relationship along the inlet airflow path.

4. The turbine engine of claim 1 wherein at least one of the first and second plenum inlets defines an axial scavenge flow path with respect to the engine centerline.

5. The turbine engine of claim 4 wherein the other of the first and second plenum inlets defines a radial scavenge flow path.

6. The turbine engine of claim 1 wherein the first plenum inlet defines an axially oriented first scavenge flow path and the second plenum inlet defines a radially oriented second scavenge flow path.

7. The turbine engine of claim 1 further comprising a plurality of guide vanes in at least one of the first and second plenum inlets, wherein the plurality of guide vanes turn from a substantially axial direction to a circumferential direction.

8. The turbine engine of claim 7 wherein the first and second plenum inlets are circumferential and the plurality of guide vanes comprises multiple circumferentially spaced vanes.

9. The turbine engine of claim 1 wherein the first and second plenum inlets are spaced so as to eliminate recirculation within the engine inlet between the first and second plenum inlets.

10. A method of separating particles from an inlet airflow of a turbine engine having a centerbody and an engine inlet, wherein the turbine engine defines an engine centerline, wherein the engine inlet has an impact surface and defines an inlet duct, wherein the inlet duct defines an inlet airflow path and comprises an inner surface defining a turn about the centerbody defined between an inlet and an outlet and having a turn angle of 100° or more, wherein the impact surface is upstream of the inlet duct, the method comprising:
drawing a first scavenge airflow from the inlet airflow through a first plenum inlet positioned outwardly from the impact surface and radially outwardly from the turn, the first plenum inlet coupling a first scavenge plenum to a first portion of the turn about the centerbody, wherein a first mass particle entrained within the inlet airflow impacts the impact surface and slows before entering the inlet duct, wherein the first mass particle is carried by inertia into the first plenum inlet as the first scavenge airflow;
drawing a second scavenge airflow from the inlet airflow through a second plenum inlet positioned outwardly from the turn, the second plenum inlet coupling a second scavenge plenum to a second portion of the turn about the centerbody axially aft of the first portion of the turn about the centerbody, wherein a second mass particle entrained within the inlet airflow bypasses the first scavenge airflow and is carried by inertia into the second plenum inlet as the second scavenge airflow, wherein the first and second scavenge airflows are fluidly isolated from each other; wherein the first and second plenum inlets correspond to a first and second plenum, and the first and second plenum inlets are axially spaced with respect to the engine centerline.

11. The method of claim 10 wherein at least one of the first and second scavenge airflows is drawing from a radial outer extent of the inlet airflow.

12. The method of claim 11 wherein the first and second scavenge airflows are at least one of axially and radially offset with respect to the engine centerline.

13. The method of claim 12 wherein the first and second plenum inlets are axially spaced with respect to the engine centerline with the second plenum inlet being located downstream of the first plenum inlet.

14. The method of claim 10 wherein the drawing of the first and second scavenge airflows comprises at least one of axially or radially drawing with respect to the engine centerline.

15. The method of claim 14 wherein the at least one of axially or radially drawing comprises axially drawing the first scavenge airflow and radially drawing the second scavenge airflow.

16. The method of claim 15 wherein the drawing of the first and second scavenge airflows comprises drawing the first and second scavenge airflows into corresponding first and second radial scavenge plenums, which are fluidly separated.

17. The method of claim 10 wherein the drawing of the first and second scavenge airflows is done without recirculation in the inlet airflow between the first and second scavenge airflows.

18. The method of claim 10 wherein the drawing of the second scavenge airflow is downstream in the inlet airflow relative to the drawing of the first scavenge airflow.

19. An inlet particle separator for an engine having an engine inlet, the inlet particle separator comprising:
a radially outer and a radially inner surface defining an inlet, the inlet comprises an impact surface, the radially inner surface comprises a turn about a centerbody defined between the inlet and an outlet and having a turn angle of 100° or more;
first and second scavenge plenums arranged radially outward and extending circumferentially at least partially about the inlet;
first and second plenum inlets corresponding to the first and second plenums positioned radially outward of the turn, wherein the first and second plenum inlets define corresponding first and second scavenge flow paths, which are fluidly separate, wherein the first plenum inlet is positioned radially outward of the impact surface, wherein the first plenum inlet fluidly couples the first scavenge plenum to a first portion of the turn about the centerbody, and wherein the second plenum inlet fluidly couples the second scavenge plenum to a second portion of the turn about the centerbody;
a first plurality of guide vanes in the first plenum inlet, wherein the first plurality of guide vanes turn from a substantially axial direction to a circumferential direction; and
a second plurality of guide vanes in the second plenum inlet, wherein the second plurality of guide vanes turn from a substantially axial direction to a circumferential direction.

20. The inlet particle separator of claim 19 wherein the first and second scavenge plenums are radially offset relative to each other with respect to an engine centerline.

21. The inlet particle separator of claim 19 wherein the first and second scavenge plenum inlets are axially spaced relative to each other with respect to an engine centerline with the second plenum inlet being located downstream of the first plenum inlet.

22. The inlet particle separator of claim 19 wherein at least one of the first and second scavenge flow paths is an axial scavenge flow path with respect to an engine centerline.

23. The inlet particle separator of claim 22 wherein the other of the first and second scavenge flow paths is a radial scavenge flow path with respect to the engine centerline.

* * * * *